United States Patent [19]

Kanai

[11] Patent Number: 4,583,783
[45] Date of Patent: Apr. 22, 1986

[54] SEAT SUPPORT FOR A VEHICLE SEAT

[75] Inventor: Shigeru Kanai, Akishima, Japan

[73] Assignee: Tachikawa Spring Co., Ltd., Tokyo, Japan

[21] Appl. No.: 594,315

[22] Filed: Mar. 28, 1984

[51] Int. Cl.[4] .............................................. A47C 7/02
[52] U.S. Cl. ............................ 297/452; 160/DIG. 15; 297/460
[58] Field of Search ............... 297/452, 460; 160/378, 160/DIG. 15, 327, 328

[56] References Cited

U.S. PATENT DOCUMENTS

| 3,170,215 | 2/1965 | Hopkins | 160/DIG. 15 |
| 3,217,786 | 11/1965 | Earl | 297/452 |
| 3,273,497 | 9/1966 | Rosema et al. | 160/378 |
| 3,310,861 | 3/1967 | Oddsen | 297/452 X |
| 4,352,524 | 10/1982 | Crosby | 297/452 |

Primary Examiner—James T. McCall
Attorney, Agent, or Firm—Cushman, Darby and Cushman

[57] ABSTRACT

A seat support for a vehicle seat is disclosed which comprises a seat frame, two connection members respectively mounted to the two side members of the seat frame and a support member formed of a cloth. In this seat support, the cloth support member is extended between and mounted to the two side frame members of the seat frame by means of the two connection members. The connection members are fixed to the two frame members respectively in such a manner that the support member can be extended in a tensioned manner.

10 Claims, 18 Drawing Figures

FIG. I (A) (PRIOR ART)
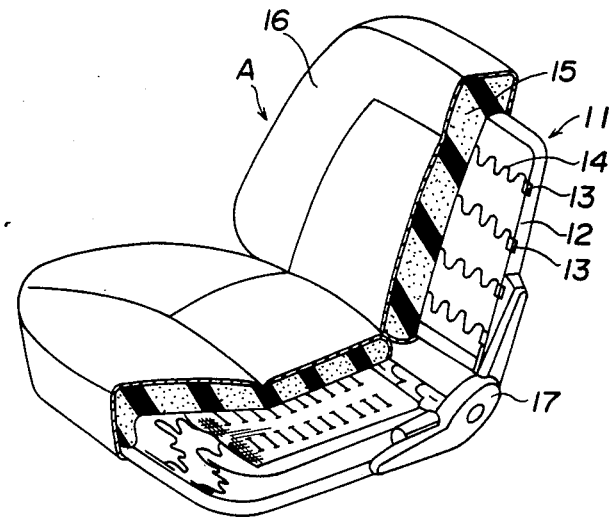
FIG. I (B) (PRIOR ART)
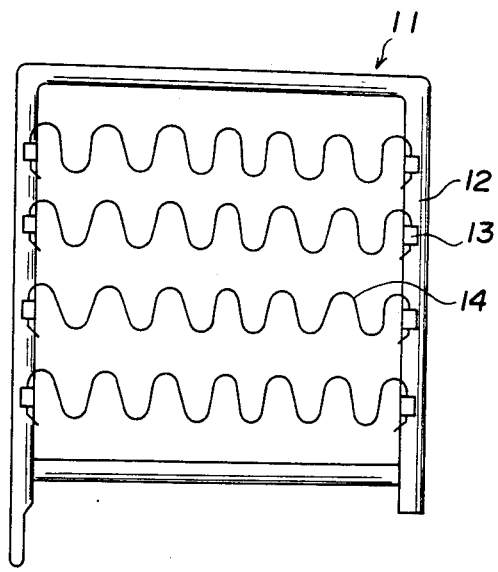

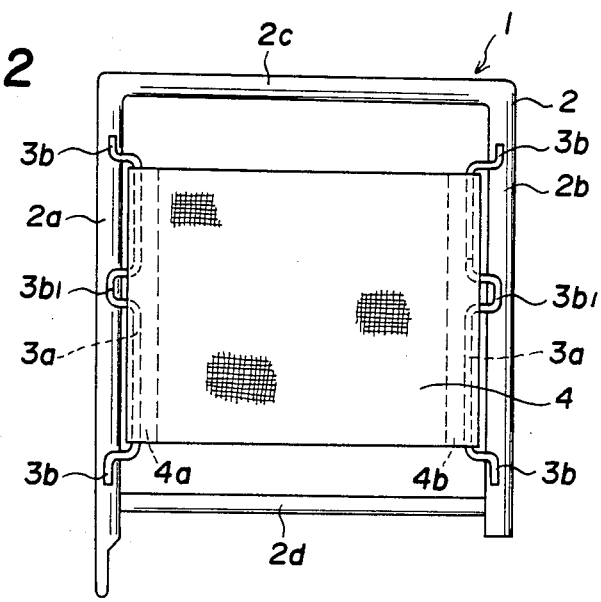
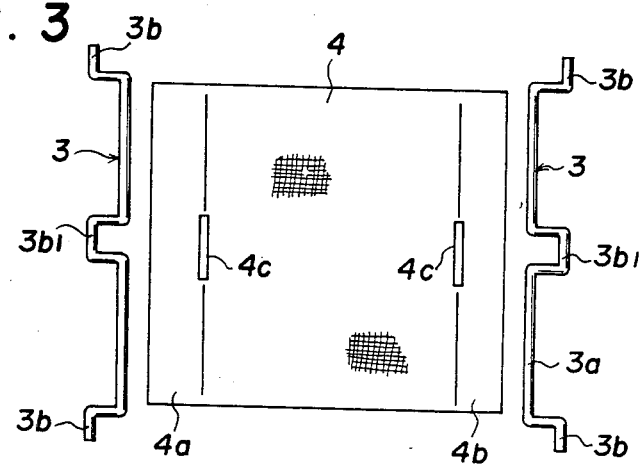
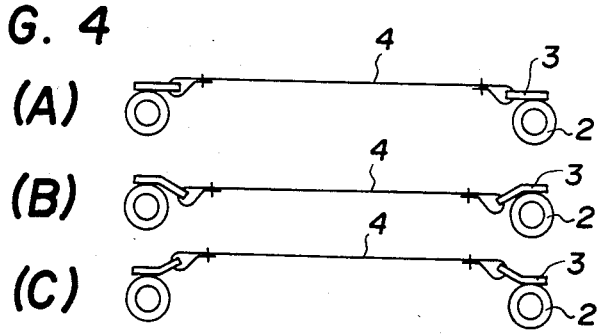

4,583,783

SEAT SUPPORT FOR A VEHICLE SEAT

BACKGROUND OF THE INVENTION

1. Field of the Invention

The present invention relates to an improved seat support suitable for a vehicle seat which is simplified in structure as well as being reduced in both weight and cost.

2. Description of the Prior Art

A conventional vehicle seat (A), as shown in FIG. 1(A), comprises a seat support (11), a cushion pad of a foam material (15) placed over the seat support (11), and a top member (16) covering the cushion pad (15). Such seat support (11) includes a seat frame (12), a plurality of clamps (13) welded to the seat frame (12), and a plurality of zigzag springs (14) secured to the clamps (13), as illustrated in FIG. 1(B). During production of such conventional seat support (11), it takes some time to weld the clamps (13) to the seat frame (12) as well as to secure the zigzag springs (14) to the clamps (13). Also, during use of the same, grating sounds may be produced between the zigzag springs (14) and their associated clamps (13). Moreover, since a plurality of zigzag springs (14) are used, it is difficult to reduce the weight and cost of the vehicle seat provided with such seat support. For reference, in FIG. 1(A) numeral (17) designates a reclining device.

SUMMARY OF THE INVENTION

In view of the circumstances, the present invention aims at eliminating the above-mentioned drawbacks in the prior art seat support.

Accordingly, the principal object of the invention is to provide a lighter weight seat support. In accomplishing this object, according to the invention, a support member of a fiber material is employed instead of the metallic zigzag springs that have been used in the above-mentioned seat support. This support member is extended between and mounted to the right and left side portions of a seat frame in a tensioned manner, and thus a cushion pad is located and mounted to this support member. Therefore, the invention, by use of the fiber support member, can eliminate the need to provide a cloth on the rear surface of the cushion pad so as to prevent the cushion pad from wearing due to the zigzag spring members as in the conventional seat support.

Another object of the invention is to simplify the manufacturing process of the seat support as well as to reduce the cost thereof. In other words, the invention contemplates the elimination of welding a large number of clamps to a seat frame and for securing a plurality of zigzag springs to their associated clamps as in the conventional device. To attain this object, according to the invention, two connection means mounting the fiber support member are fixed respectively to the opposing side frame portions of the seat frame. The connection means each of a iron or steel wire are inserted through through-bores formed in the two side portions of the support member, and both ends of the respective connection means which are extended from the support member are fixed to the respective side frame portions of the seat frame by welding. This eliminates the needs for welding a large number of clamps and for securing a plurality of springs, permitting reduction of the number of man-hour in assembling. In addition, since there is no need of clamps and springs, the cost of the invention can be reduced.

In another aspect of the invention, the tension of the support member can be adjusted with ease. The zigzag springs used in the conventional device have a predetermined constant tensile force that cannot be changed as necessary. However, according to the invention, since the tension of the support member can be easily adjusted by varying a manner of mounting of the connection means to the seat frame, the cushioning property of the cushion pad can be fully performed.

These and other objects, features and advantages of the invention will become more apparent upon reading of the following detailed specification in connection with the accompanying drawings.

BRIEF DESCRIPTION OF THE DRAWINGS

FIG. 1(A) is a partially cutaway, perspective view of a vehicle seat provided with a conventional seat support;

FIG. 1(B) is a front view of the conventional seat support;

FIG. 2 is a front view of a first embodiment of the seat support of the present invention;

FIG. 3 is an exploded view of the first embodiment shown in FIG. 2;

FIGS. 4(A), (B), and (C) are section views of the support member being assembled to the seat frame, respectively;

DETAILED DESCRIPTION OF PREFERRED EMBODIMENTS OF THE INVENTION

Figure 5:
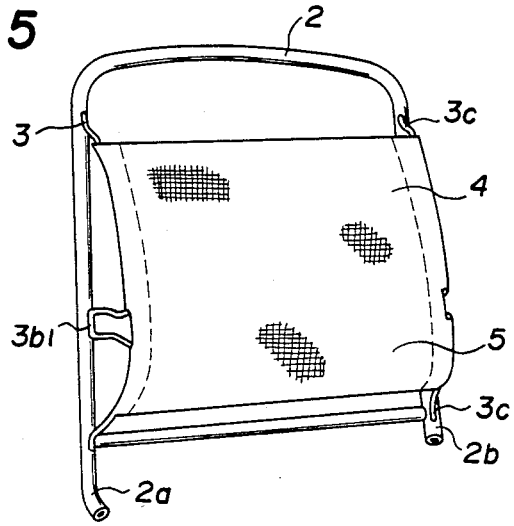
FIG. 5 is a perspective view of a second embodiment of the invention.

In FIGS. 2 through 4, there is shown a first embodiment of the invention. In assembling a seat support (1), first a seat frame (2) including right and left side frame portions (2a),(2b) is prepared, then two connection members (3),(3) each comprising engagement pieces (3a) and fixing pieces (3b) are fixed to the right and left side frame portions (2a) and (2b) of the seat frame (2) respectively. After a support member (4), formed of a fiber material, is extended between the right and left connection members (3) and (3), the fixing pieces (3b) of these connection members are bent so that the support member (4) is mounted to the seat frame (2) through the connection members (3) in a tensioned manner.

Seat frame (2) forming a part of the seat support (1) is constructed in a substantially rectangular form by the right and left side frame members (2a),(2b) and upper and lower frame members (2c),(2d) each of which is formed of a pipe material. The seat frame (2), if necessary, may be formed of materials other than the above-mentioned pipe material which have a substantially L-shaped or U-shaped cross section.

Each of the connection members (3), which is made of an iron or steel wire, comprises the engagement pieces (3a) for engagement with the support member (4) as well as the fixing pieces (3b) that are bent at suitable positions, namely, at both ends and intermediate portion a connection member (3). After the support member (4) is mounted to the engagement pieces (3a) of the connection members (3), such connection members (3) are welded and fixed onto the two side frames (2a),(2b) of the seat frame (2) by means of their fixing pieces (3b), respectively.

Support member (4) is formed of such a strong fiber material that can sufficiently withstand the weight of a seat occupant, such as a non-woven fabric, canvas, vinyl leather, hessian cloth, polypropyrene mesh cloth and the like. The support member (4) is provided in its right and left side portions with portions to be turned over (4a),(4b) respectively, within which there are formed insertion bores (4c) respectively. With this arrangement, in assembling the seat support of the invention, after the central fixing pieces (3b-1) of the connection members (3) are inserted through these insertion bores (4c) respectively, the right and left portions to be turned over (4a) and (4b) of the support member (4) are folded back to receive the engagement pieces (3a) therein, then these turned-over portions (4a) and (4b) are closed by sewing or welding, and finally the fixing pieces (3b) and the central fixing pieces (3b-1) of the connection members (3) are welded and fixed to the two side frames (2a) and (2b) of the seat frame (2), respectively. Alternatively, the support member (4) may be mounted and fixed with respect to the connection member (3) in the same manner as mentioned above, after the connection members (3) are fixed by welding to the two side frames (2a) and (2b) of the seat frame (2).

After the support member (4) has been assembled to the seat frame (2) in this manner, the fixing pieces (3b) of the connection member (3) are bent by pressing or other suitable means from the state shown in FIG. 4(A) upwardly as shown in FIG. 4(B), or downwardly as shown in FIG. 4(C) so that the distance between the right and left engagement pieces (3a),(3a) is increased. As a result of this, a tensile force is applied to the support member (4) which is in turn extended between and mounted onto the seat frame (2) in a tensioned manner. Thus, the seat support (1) of the invention is completed.

FIG. 5 illustrates a second embodiment of the invention in which each of connection members (3) is provided with both ends (3c),(3c) and a central fixing piece (3b-1). After a support member (4) is mounted to the connection members (3), the connection members (3) are fixed to the right and left frame members (2a),(2b) of a seat frame (2), and the central fixing piece (3b-1) is then bent outwardly so as to form a seat support (1). With the thus arranged seat support (1), since the central fixing pieces (3b-1) are projected forwardly, the support member (4) can be extended between and mounted onto the connection members (3) in a strongly tensioned manner to provide a lumbar support portion (5).

Figure 6:
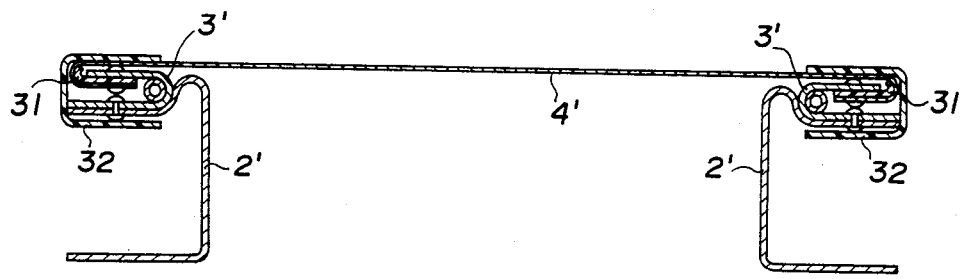
FIG. 6 is a section view of a third embodiment of the invention.
Figure 7:
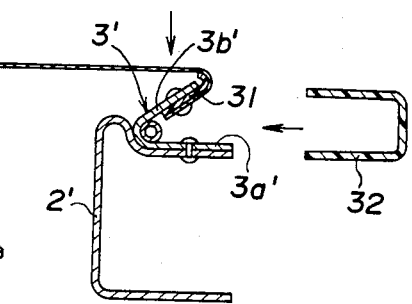
FIG. 7 is a partially longitudinal section view of the third embodiment, illustrating the assembling of the support member to the seat frame.
Figure 8:
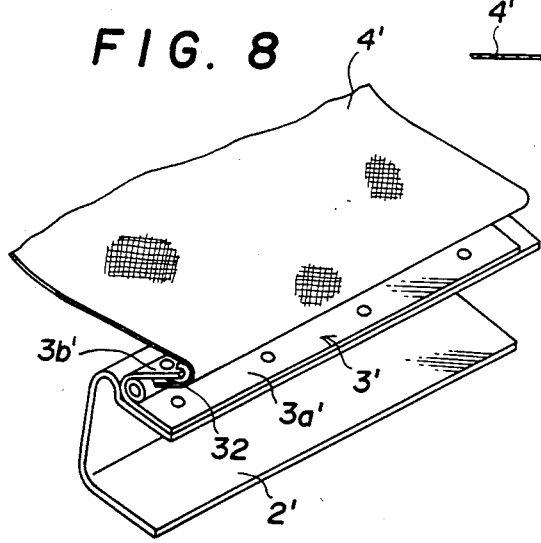
FIG. 8 is a perspective view of the third embodiment of the invention.

In FIGS. 6 to 8, there is shown a third embodiment of the invention in which hinges are employed as connection members (3'). Each of the hinge connection members (3') has its one wing (3a') fixed to a U-shaped seat frame (2') by welding or riveting and its other wing (3b') fixed to a support member (4'). Thus, when the connection members (3') are closed, the support member (4') can be extended over and mounted onto the seat frame (2') in a tensioned manner. Specifically, FIG. 6 illustrates a state in which the support member (4') is extended over and mounted to the seat frame (2'), and FIGS. 7 and 8 show a manner in which the support member (4') can be changed from its relaxed position into its tensioned position.

The support member (4') is preferably formed of such a material that has a suitable expansion property, although it may be made of a non-expansion material as in the above-mentioned embodiments of the invention.

In addition, the support member (4') is provided at the both ends thereof with synthetic resin plates (31) fixed thereto by sewing, or by use of an adhesive or a high-frequency welding so that the support member (4') can be prevented from coming off from the connection members (3') after it is fixed to the latter. The support member (4') is riveted to the connection members (3') by means of these synthetic resin plates. Also, in order to assure that the hinge-type connection member (3') is maintained closed, a U-shaped grasp member (32) is provided which serves to grasp the connection member (3') with respect to the seat frame (2'). The connection member (3') is formed of a steel plate or synthetic resin. It is noted that use of such connection member (3') facilitates the extension operation of the support member (4').

In FIGS. 9 through 15, there is illustrated a fourth embodiment of the invention in which a support member (4'') is provided at its corner portions with connection members (3a-1'') each composed of an insertion member, and also in which the support member (4'') can be extended over and mounted onto the seat frame (2) or (2'') by inserting the connection members (3a-1'') into the seat frame (2) or (2'').

Figure 9:
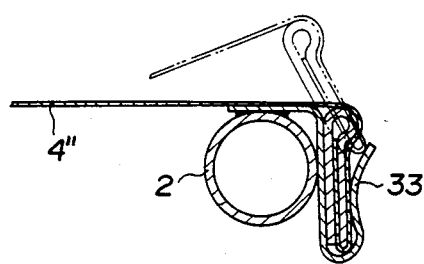
FIG. 9 is a partially longitudinal section view of a fourth embodiment of the invention.
Figure 10:
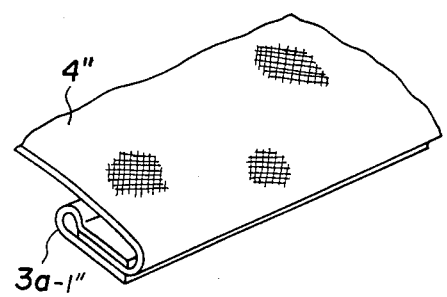
FIG. 10 is a partially cutaway perspective view of the support member provided with the connection means shown in FIG. 9.

Specifically, referring to FIGS. 9 and 10, the support member (4'') can be extended over and mounted to the seat frame (2) in its tensioned position in a manner that the end portions of the support member (4'') are folded back to form a U-shaped configuration, these U-shaped end portions are put into the associated connection members (3a-1''), and the connection members (3a-1'') along with the U-shaped end portions of the support member (4'') are inserted into their associated engagement members (33) fixedly secured to the outer suface of the seat frame (2). Each of the engagement members (33) is made of a metal plate which is welded to the seat frame (2).

Figure 11:
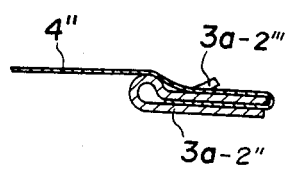
FIG. 11 is a longitudinal section view of a connection member provided with a clip and fixed to the support member of the invention.

FIG. 11 illustrates a connection member (3a-2'') which is provided with a clip (3a-2''') so as to secure the support member (4'') in a more positive manner.

Figure 12:
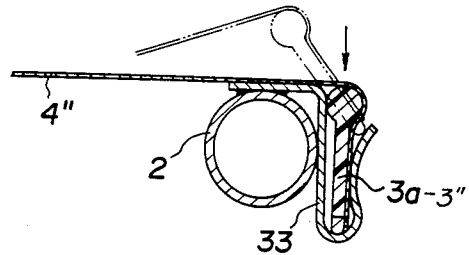
FIG. 12 is a partially sectional view of the support member including a connection member of synthetic resin, showing how the support member is extended and mounted.

Referring to FIG. 12, the support member (4'') can be extended over and mounted to the seat frame (2) by sewing connection members (3a-3'') each of synthetic resin to the support member (4″) by use of a sewing machine and then inserting the sewn connection members (3a-3″) into the associated engagement members (33).

Figure 13:
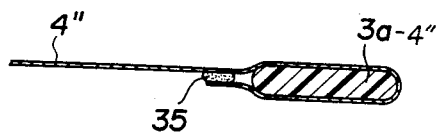
FIG. 13 is a partially sectional view of the support member of the invention having a connection member inserted through its bag-like edge portion.
Figure 14:
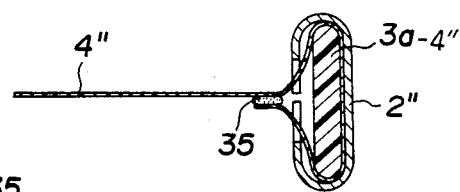
FIG. 14 is a partially sectional view of the support member shown in FIG. 13, illustrating its extended state; and, FIG. 15 is a partially longitudinal section view of the support member of the invention provided with a special means for easy connection.
Figure 15:
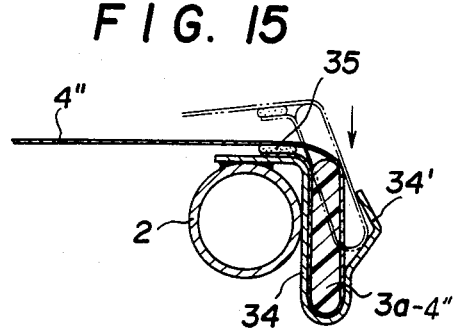

Next, in FIG. 13, the end portions of the support member (4″) are folded back and these folded-back end portions are then bonded together with an adhesive (35) or sewn together by means of a sewing machine so as to form bags, respectively. Thereafter, connection members (3a-4″) each of a hard material such as a hard synthetic resin and a cardboard. Each of the connection members (3a-4″), as shown in FIGS. 14 and 15, is to be fixed to a seat frame (2″) or (2). In other words, in FIG. 14, the seat frame (2″) is constructed in a C-shaped form, and the connection member (3a-4″) is inserted into the C-shaped seat frame (2″) so that a tensile force is applied to the support member (4″). Further, in FIG. 15, an engagement member (34), which is fixed to the seat frame (2), is provided with a guide portion (34′) so that the connection member (3a-4″) can be inserted into the engagement member (34) easily.

As can be clearly understood from the foregoing description, the present invention provides several advantageous effects over the prior art devices. For example, since the need for any metal springs is eliminated, the entire weight of the seat can be reduced, the uncomfortable grating noise of the metal springs can be avoided, and no strange touch will be produced. Also, since a cushion pad is laced over the seat frame by means of a support member, there is eliminated the need for reinforcement treatments such as apllication of a metal coth to the rear surface of the cushion pad, which reduces the cost of the seat.

Moreover, as the need for a plurality of springs and clamps is eliminated, the number of parts required can be decreased substantially and thus the number of man-hour can be reduced, resulting in the reduction of the cost.

In addition, the tension of the support member can be easily adjusted by changing the manner of mounting of the connection members to the seat frame and thus the cushion pad can perform its performance fully, providing an improved sitting feeling.

What is claimed is:

1. A seat support for a vehicle seat comprising a substantially rectangular seat frame including two opposing side frame members, two connection members respectively mounted to the two opposing side frame members of said seat frame, and a support member comprising a cloth material extended between said two connection members, wherein said two connection members are fixedly secured to said seat frame in a manner that said support member can be extended over and mounted to said seat frame, and wherein said two connection members are bent forwardly in the central portions thereof to form respective lumbar support portions.

2. The seat frame as recited in claim 1, wherein said two connection members are made respectively of a steel or iron wire and are inserted into bag-shaped portions provided in said support member along both ends thereof, and wherein the portions of said connection members which are projected outwardly of said bag-shaped portions of said support member are fixed to said seat frame by welding and are thereafter bent outwardly by pressing, respectively.

3. The seat frame as recited in claim 1, wherein each of said connection members is composed of a hinge and wherein one wing of said hinge is fixed to the end portion of said support member and the other wing thereof is fixed to said seat frame.

4. The seat frame as recited in claim 1, wherein each of said connection members comprises an insertion member formed of a hard material and fixed along the end portion of said support member, and wherein said each connection member is engaged with an associated engagement member fixed to said seat frame such that said support member can be extended in a tensioned manner.

5. The seat frame as recited in claim 1, wherein said support member is formed of an expansion or nonexpansion cloth.

6. The seat frame as recited in claim 1, wherein said support member and said connection members are fixed to each other by adhering or sewing.

7. A vehicle seat support comprising:
a seat frame including a pair of separated opposing frame members;
a fabric support member having opposing side portions adapted to be extended in a tensioned state between said opposing frame members;
first and second connection means each rigidly connected to a respective one of said opposing frame members and said opposing side portions for maintaining said fabric support in said tensioned state between said opposing frame members, each said first and second connection means including:
(a) a generally U-shaped hinge connection member having a lower wing thereof fixed to said respective frame member and an upper wing thereof attached to said respective fabric support side portion, each said connection member being positioned such that said upper and lower wings of one of said connection member extend away from said upper and lower wings, respectively, of the other said connection member, said upper wings of each connection member together forming the means by which said tensioned state is adjustable by resiliently bending said upper wings so as to displace same relative to its respective lower wing, and
(b) a U-shaped grasp member in registry with and substantially enveloping said connection member for maintaining the resilient bend in said upper wing.

8. A vehicle seat as in claim 7 wherein each said first and second connection means further includes means defining a forwardly bent portion to establish a lumbar support region of said fabric support member.

9. A vehicle seat support comprising:
a seat frame including a pair of separated opposing frame members;
a fabric support member having opposing side portions extended between said opposing frame members so as to be maintained in a tensioned state,
said opposing frame members each including connection means for holding a respective side portion of said fabric support member to maintain said fabric support member in said tensioned state, said connection means including a lower generally U-shaped portion oriented substantially perpendicular to said fabric support member and an upper portion having means defining a guide surface which slopes downwardly and inwardly toward said U-shaped portion,
said opposing side portions each including insertion means inserted into said U-shaped portion of a respective connection means to thereby also be oriented substantially perpendicular to said fabric support member to hold said fabric support member in said tensioned state between said opposing frame members, said guide surface-defining means for guiding said insertion means into said U-shaped portion during insertion of said insertion means into said connection means.

10. A vehicle seat as in claim 9 wherein said insertion means is a clip member.

* * * * *